(12) United States Patent
Chan et al.

(10) Patent No.: US 12,017,656 B2
(45) Date of Patent: Jun. 25, 2024

(54) TECHNOLOGY FOR NOTIFYING VEHICLE OPERATORS OF INCIDENT-PRONE LOCATIONS

(71) Applicant: STATE FARM MUTUAL AUTOMOBILE INSURANCE COMPANY, Bloomington, IL (US)

(72) Inventors: Aaron Scott Chan, San Jose, CA (US); John A. Nepomuceno, Bloomington, IL (US); Kenneth J. Sanchez, San Francisco, CA (US); Jeremy Fogg, Bloomington, IL (US); Mohamed A. Wazeer, Normal, IL (US); Sanjay Jayaswal, Bloomington, IL (US); Lynn Splittstoesser, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 12 days.

(21) Appl. No.: 17/511,285

(22) Filed: Oct. 26, 2021

(65) Prior Publication Data
US 2022/0048518 A1 Feb. 17, 2022

Related U.S. Application Data

(63) Continuation of application No. 16/393,187, filed on Apr. 24, 2019, now Pat. No. 11,186,288, which is a
(Continued)

(51) Int. Cl.
*B60W 40/08* (2012.01)
*B60W 30/08* (2012.01)
(Continued)

(52) U.S. Cl.
CPC ............ *B60W 40/08* (2013.01); *B60W 30/08* (2013.01); *B60W 50/14* (2013.01); *G06V 20/597* (2022.01);
(Continued)

(58) Field of Classification Search
CPC ...... B60W 40/08; B60W 30/08; B60W 50/14; B60W 2040/0818; B60W 2050/143;
(Continued)

(56) References Cited

U.S. PATENT DOCUMENTS 8,289,187 B1 10/2012 Kerr
9,311,271 B2 4/2016 Wright
(Continued)

FOREIGN PATENT DOCUMENTS

EP 3239686 A1 11/2017
EP 3578433 B1 8/2020
(Continued)

*Primary Examiner* — Aaron L Troost
(74) *Attorney, Agent, or Firm* — MARSHALL, GERSTEIN & BORUN LLP

(57) ABSTRACT

Systems and methods for improving vehicular safety are disclosed. According to embodiments, an electronic device may collect or accumulate various sensor data associated with operation of a vehicle by an individual, including image data, telematics data, and/or data indicative of a condition of the individual. The electronic device may analyze the sensor data to determine whether the individual is distracted and whether the vehicle is approaching a location that may be prone to incidents. The electronic device may accordingly generate and present a notification to the individual to mitigate any posed risks.

20 Claims, 6 Drawing Sheets

Related U.S. Application Data continuation of application No. 15/365,619, filed on Nov. 30, 2016, now Pat. No. 10,308,256.

(60) Provisional application No. 62/261,639, filed on Dec. 1, 2015.

(51) Int. Cl.
*B60W 50/14* (2020.01)
*G06V 20/59* (2022.01)

(52) U.S. Cl.
CPC ............... *B60W 2040/0818* (2013.01); *B60W 2050/143* (2013.01)

(58) Field of Classification Search
CPC ....... B60W 2520/10; B60W 2520/105; B60W 2540/22; B60W 2556/50; G06V 20/597
See application file for complete search history.

(56) References Cited

U.S. PATENT DOCUMENTS

| | | |
|---|---|---|
| 9,633,487 B2 | 4/2017 | Wright |
| 9,830,748 B2 | 11/2017 | Rosenbaum |
| 9,990,782 B2 | 6/2018 | Rosenbaum |
| 10,192,369 B2 | 1/2019 | Wright |
| 10,198,879 B2 | 2/2019 | Wright |
| 10,269,190 B2 | 4/2019 | Rosenbaum |
| 10,467,824 B2 | 11/2019 | Rosenbaum |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2007/0080816 A1 | 4/2007 | Haque et al. |
| 2009/0040054 A1 | 2/2009 | Wang et al. |
| 2010/0007479 A1 | 1/2010 | Smith |
| 2010/0102972 A1* | 4/2010 | Middlekauff ...... B62D 15/0215 340/576 |
| 2010/0332131 A1* | 12/2010 | Horvitz .............. G01C 21/3697 701/414 |
| 2013/0179023 A1* | 7/2013 | Schmidt ................ B60W 50/14 701/23 |
| 2014/0222277 A1 | 8/2014 | Tsimhoni et al. |
| 2015/0029031 A1 | 1/2015 | Pank |
| 2015/0109131 A1* | 4/2015 | Lindberg ............. B60K 28/066 340/576 |
| 2015/0314681 A1 | 11/2015 | Riley, Sr. et al. |
| 2015/0328985 A1 | 11/2015 | Kim et al. |
| 2016/0167671 A1 | 6/2016 | Offenhaeuser et al. |
| 2016/0207455 A1 | 7/2016 | Kim |
| 2016/0214618 A1 | 7/2016 | Wulf |
| 2016/0375911 A1 | 12/2016 | Coelingh et al. |
| 2016/0379485 A1 | 12/2016 | Anastassov et al. |
| 2017/0120749 A1 | 5/2017 | Dias et al. |
| 2017/0120925 A1 | 5/2017 | Stefan et al. |
| 2017/0282792 A1 | 10/2017 | Illy |
| 2019/0056732 A1 | 2/2019 | Aoi et al. |
| 2022/0092893 A1 | 3/2022 | Rosenbaum |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

* cited by examiner

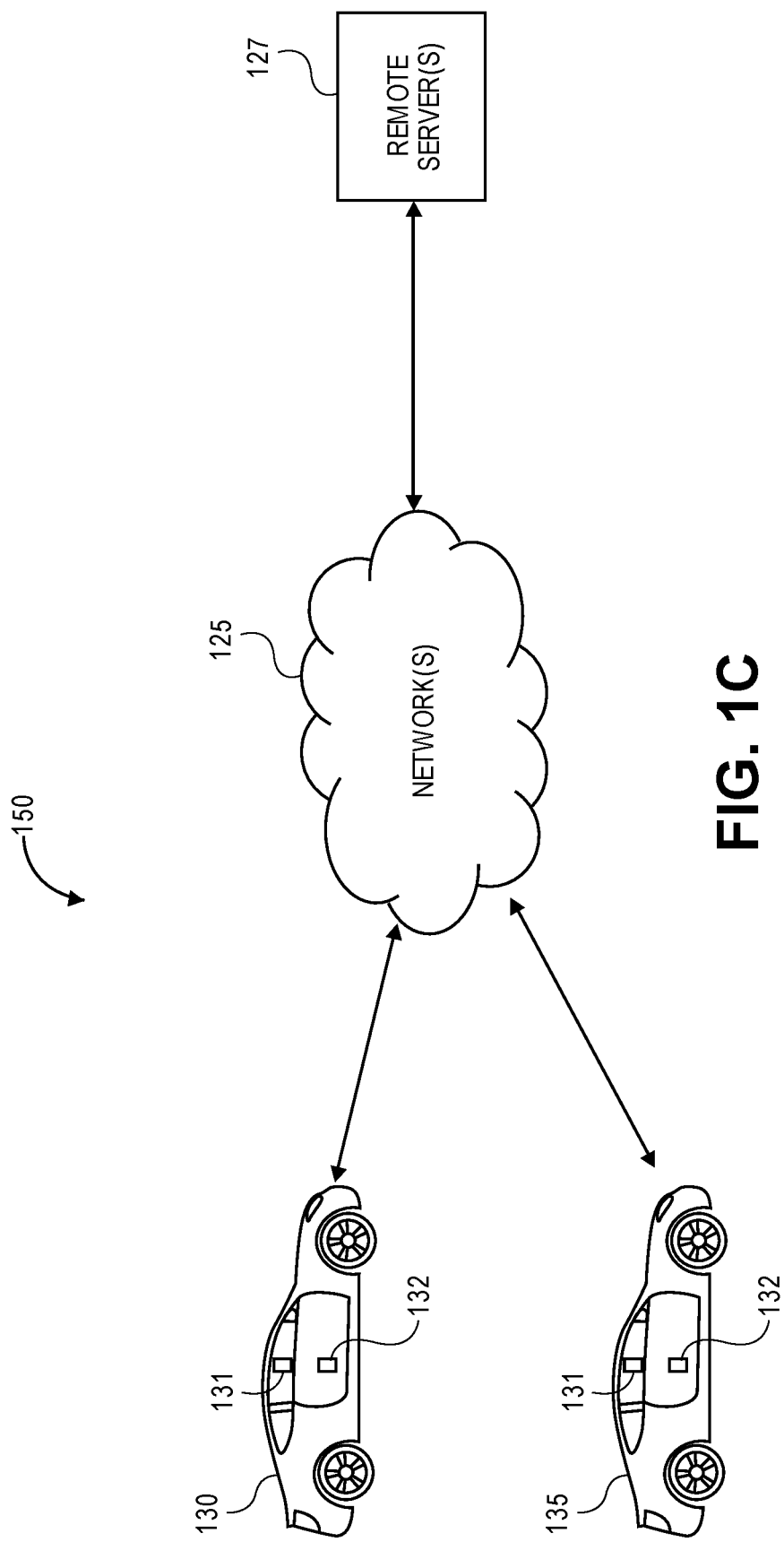

TECHNOLOGY FOR NOTIFYING VEHICLE OPERATORS OF INCIDENT-PRONE LOCATIONS

CROSS-REFERENCE TO RELATED APPLICATIONS

This application is a continuation of U.S. patent application Ser. No. 16/393,187, filed Apr. 24, 2019, which is a continuation of U.S. patent application Ser. No. 15/365,619, now U.S. Pat. No. 10,308,256, filed Nov. 30, 2016, which claims priority to U.S. Provisional Application No. 62/261,639, filed Dec. 1, 2015, the disclosures of which are hereby incorporated by reference in their entireties.

FIELD

The present disclosure is directed to using sensor data to detect incident-prone locations. More particularly, the present disclosure is directed to systems and methods for analyzing sensor data to notify distracted drivers of upcoming locations that are prone to incidents.

BACKGROUND

Individuals have been operating and traveling in vehicles as a means of transportation for decades. With the increasing prevalence of electronic devices and sensors, there are more available components to generate data associated with vehicle operation. For example, vehicle sensors can measure or detect vehicle location, acceleration, general movement, and other information. There are existing applications that use this data to facilitate certain functionalities. For example, vehicle operators are able to share their velocity with other vehicle operators so that the other operators may gauge certain traffic conditions.

However, there are no existing solutions for effectively and efficiently using certain types of sensor data to reduce or eliminate certain driving risks. Accordingly, there is an opportunity for systems and methods to leverage sensor data to data to identify, and reduce or eliminate certain driving risks.

SUMMARY

In an embodiment, a computer-implemented method in an electronic device is provided. The method comprises identifying a location that is deemed to be prone to distraction-related incidents, accumulating, from a set of sensors, a set of sensor data during operation of the vehicle, and analyzing, by a computer processor, the set of sensor data, comprising: determining that the vehicle is near the location, and determining that an operator of the vehicle is distracted. The method further comprises generating a notification indicating that the operator of the vehicle is distracted, and presenting the notification via a user interface of the electronic device.

In another embodiment, an electronic device is provided. The electronic device comprises a user interface configured to present content, a memory storing non-transitory computer executable instructions, and a processor configured to interface with the user interface and the memory. The processor is configured to execute the non-transitory computer executable instructions to cause the processor to identify a location that is deemed to be prone to distraction-related incidents, accumulate, from a set of sensors, a set of sensor data during operation of the vehicle, analyze the set of sensor data, comprising: determine that the vehicle is near the location, and determine that an operator of the vehicle is distracted, generate a notification indicating that the operator of the vehicle is distracted, and present the notification via a user interface of the electronic device.

BRIEF DESCRIPTION OF THE FIGURES

FIG. 1C depicts an example environment including vehicles and various components configured to facilitate various functionalities, in accordance with embodiments.

DETAILED DESCRIPTION

Figure 1A:
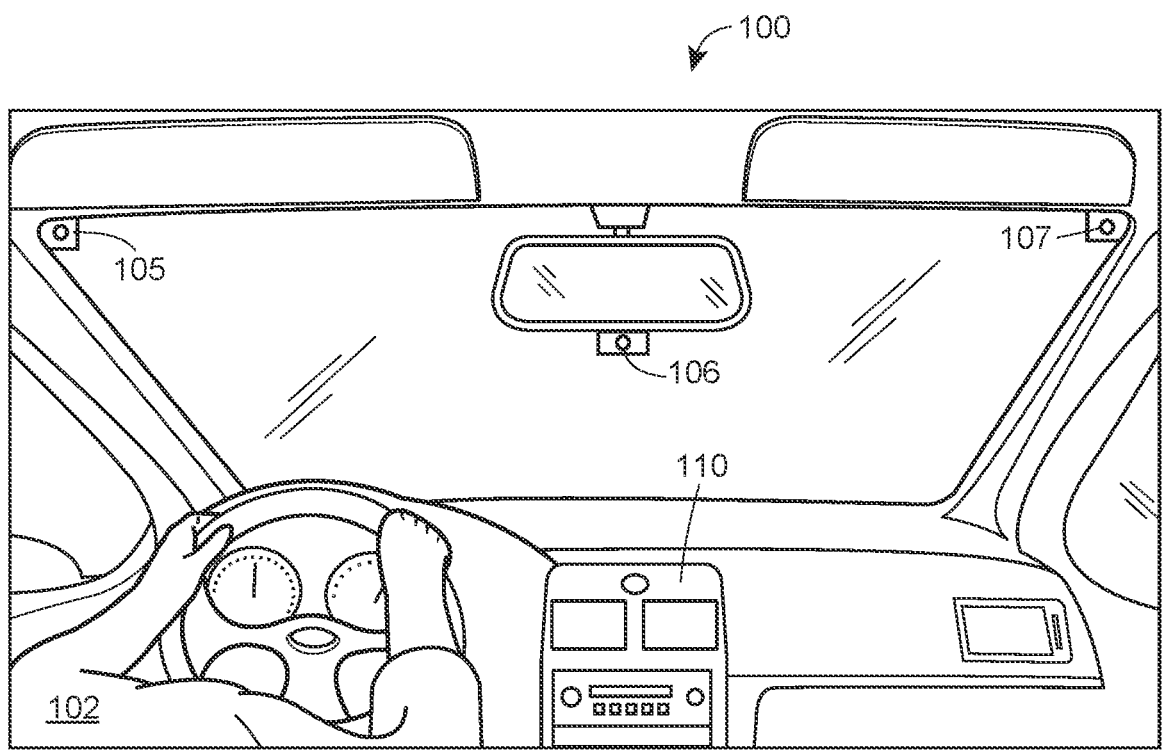
FIGS. 1A and 1B depict example environments within a vehicle including various components configured to facilitate various functionalities, in accordance with some embodiments.

The present embodiments may relate to, inter alia, generating and transmitting notifications of detected risks associated with vehicle operation. According to certain aspects, systems and methods may access sensor data from a set of sensors, where the sensor data may include image data depicting an operator of a vehicle and collected by a set of image sensors, and telematics data associated with operation of the vehicle. The systems and methods may analyze the image data to determine a level of distraction of the operator. Further, the systems and methods may determine, based on the telematics data, that the vehicle is approaching a location or area that may be especially prone to incidents.

Based on the level of distraction of the operator and the circumstance(s) of the vehicle, the systems and methods may determine that there is an elevated risk for the vehicle operator. Accordingly, the systems and methods may generate a notification that indicates the risk and optionally includes information associated with mitigating the risk. The systems and methods may then display or otherwise output the notification so that the operator of the vehicle may review the notification and take appropriate action.

The systems and methods therefore offer numerous benefits. In particular, the systems and methods effectively and efficiently determine vehicular risks based on collected and analyzed image data. Further, the systems and methods effectively and efficiently generate and present notifications that warn vehicle operators of the vehicular risks. As a result, occurrences of accidents and incidents may be reduced. It should be appreciated that other benefits are envisioned.

The systems and methods discussed herein address a challenge that is particular to vehicle operation. In particular, the challenge relates to a difficulty in assessing certain vehicular risks, and communicating notifications or warnings of the vehicular risks. Conventional technologies are not able to reconcile operator distraction levels with locations that may be prone to incidents. The systems and methods offer improved capabilities to solve these problems by accessing and analyzing a set of sensor data, including image data, location data, and telematics data, to ascertain levels of distraction and circumstances of increased location-based risk. Further, because the systems and methods employ the collection, analysis, and transmission of data associated with vehicles and vehicle operation, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data to determine vehicle operator states, collect or accumulate telematics data, and generate and display notifications, among other functionalities.

According to implementations, the systems and methods may support a dynamic, real-time or near-real-time analysis of any captured, received, and/or detected data. In particular, the electronic device may receive or capture image and telematics data in real-time or near real-time, and may automatically and dynamically analyze the captured data. The electronic device may also automatically and dynamically generate and communicate relevant notifications in real-time or near-real-time. In this regard, any individual who receives a notification is afforded the benefit of accurate and relevant data.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. The set of sensors may also be configured to detect various conditions of the individual 102, including various biometric information, movements, and/or the like.

Figure 1B:
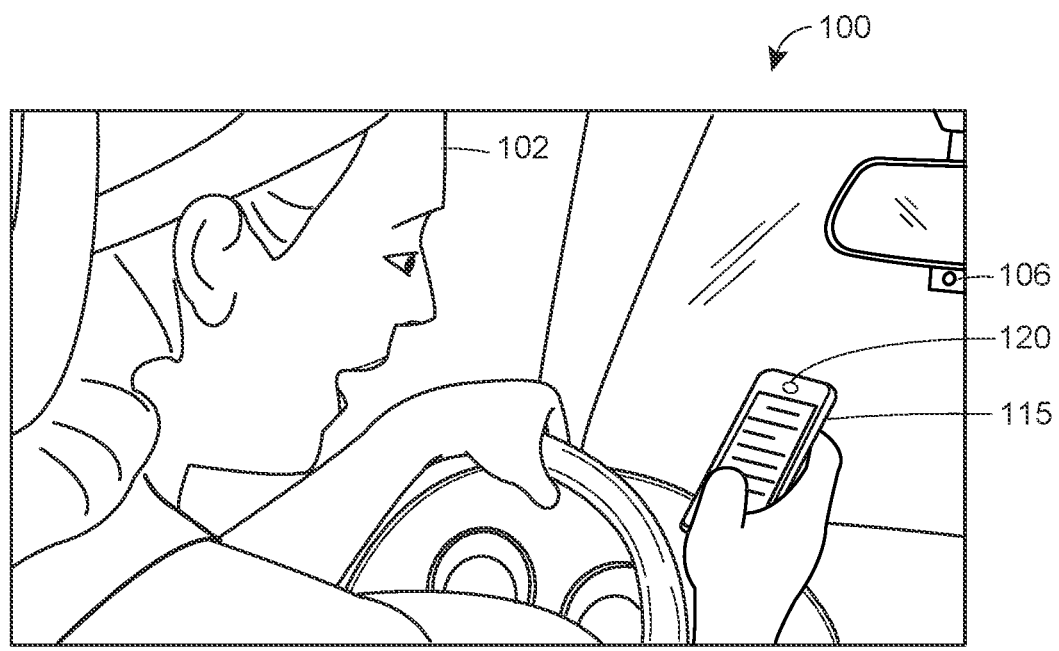

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, biometric, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. Additionally or alternatively, the electronic devices 110, 115 may analyze the image data to detect any movements made by the individual 102 that may be depicted in the image data, as well as determine or ascertain a state of the individual 102.

The electronic devices 110, 115 may further interface with the various sensors or other components to assess real-time operation data associated with the vehicle 100. For example, the real-time vehicle operation data may include any sensor data from the yaw rate sensor, the tilt sensor, the steering angle sensor, the brake sensor, and/or any other sensor. Further, the electronic devices 110, 115 may access supplemental movement data from additional sensors, such as the location module, the gyroscope, and/or the accelerometer of the electronic device 115. According to embodiments, the real-time vehicle operation data and/or the supplemental movement data may include or indicate a set of driving events corresponding to operation of the vehicle. The electronic devices 110, 115 may also access operator data from various sensors (including one or more of the image sensors 105, 106, 107), where the operator data indicates various condition(s) or movement(s) of the individual 102. The electronic devices 110, 115 may each be equipped with various user interface components, such as a display screen, that is configured to present information, receive input from users (e.g., via a selection), and/or perform other functions.

The electronic devices 110, 115 may additionally communicate with remote components via one or more network connections to retrieve additional information related to the environment of the vehicle 100 and/or operation thereof. FIG. 1C depicts a system 150 including components that may implement various of the systems and methods. The system 150 may include a set of vehicles: a vehicle 130 and a vehicle 135, such as the vehicle 100 as described with respect to FIGS. 1A and 1B. The vehicles 130, 135 may be configured with a set of electronic devices 131, 132, such as the electronic devices 110, 115 as described with respect to FIGS. 1A and 1B. Each of the electronic devices 131, 132 may be integrated within the vehicles 130, 135 or may be separate from (but located within or in proximity to) the vehicles 130, 135.

Each of the electronic devices 131, 132 may be configured to communicate with at least one remote server 127 via one or more networks 125. It should be appreciated that various amounts of the remote server(s) 127 are envisioned. According to embodiments, the remote server(s) 127 may store data (i.e., may serve as a central repository) and/or exchange data with the electronic devices 131, 132. For example, the remote server 127 may store data or information associated with a set of locations, and may provide the data or location to the electronic devices 131, 132. The remote server 127 may also including logic or processing capabilities that may instruct the electronic devices 131, 132 to perform certain actions. The network(s) 125 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) 125 may also be one or more private or local networks or dedicated frequency bands. The network(s) 125 may enable the electronic devices 131, 132 and the remote server 127 to communicate among each other in real-time or near-real time.

Figure 2:
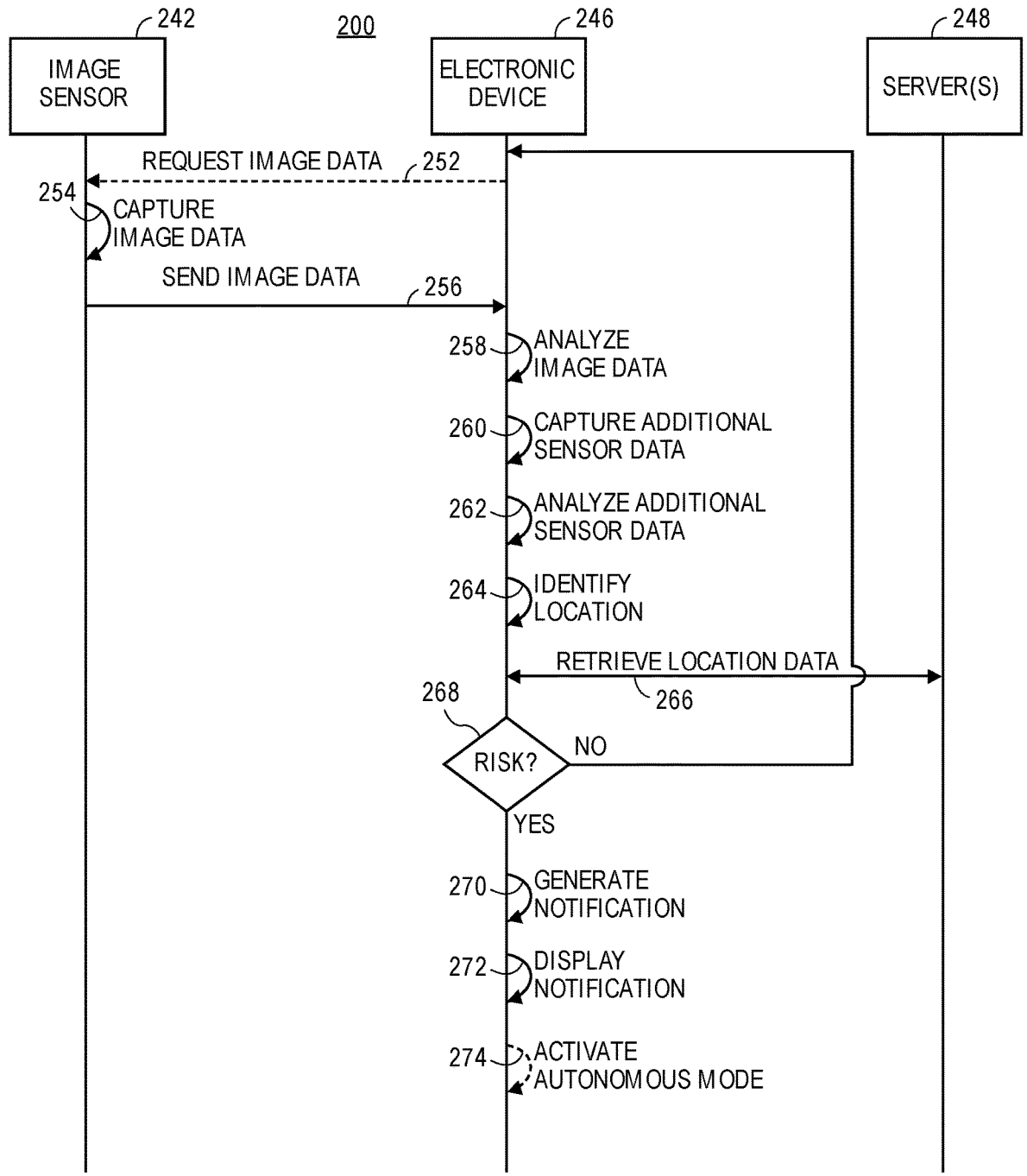
FIG. 2 depicts an exemplary signal diagram associated with assessing vehicle operation and vehicle operator condition, and facilitating the communication of notifications, in accordance with some embodiments.

FIG. 2 depicts a signal diagram 200 associated with facilitating certain functionalities of the systems and methods. The signal diagram 200 includes an image sensor 242 (such as one of the image sensors 105, 106, 107, 120 as discussed with respect to FIGS. 1A and 1B), an electronic device 246 (such as one of the electronic devices 131, 132 as discussed with respect to FIG. 1C), and at least one server 248 (such as the server 127 as discussed with respect to FIG. 1C). According to embodiments, the electronic device 246 may be located within a vehicle. Further, the electronic device 246 may be equipped with or configured to communicate with a set of sensors configured to capture data associated with operation of the vehicle. It should be appreciated that additional or alternative components and devices are envisioned.

The signal diagram 200 may begin when the electronic device 246 optionally requests (252) image data from the image sensor 242. According to embodiments, the electronic device 246 may automatically request the image data periodically (e.g., once every ten seconds, once every minute, once every hour), or a user of the electronic device 246 may cause the electronic device 246 to request the image data. Further, the request may include a specified amount of image data and/or a specific time component (e.g., real-time image(s), real-time video, image(s) and/or video recorded five minutes ago). It should be appreciated that the image sensor 242 may be internal to or external from the electronic device 246.

The image sensor 242 may capture (254) image data and send (256) the image data to the electronic device 246. In one implementation, the image sensor 242 may automatically send the image data to the electronic device 246 in real-time or near real-time as the image sensor 242 captures the image data, and/or in response to a request from the electronic device 246. In another implementation, the image sensor 242 may send previously-captured image data to the electronic device 246, such as if the image sensor 242 interfaces with some type of memory or storage. It should be appreciated that the image data may depict a vehicle operator or a passenger of the vehicle.

The electronic device 246 may analyze (258) the image data. According to embodiments, the electronic device 246 may analyze the image data to identify the individual depicted in the image data as well as a set of characteristics associated with the individual. In particular, the electronic device 246 may determine characteristics such as a level of drowsiness, an attentiveness level, movement (or non-movement) of the individual, whether the individual's eyes or opened or closed, head position and/or head movement, and/or other characteristics. In embodiments, the characteristics may be indicative of the level of distraction of the individual.

The electronic device 246 may further capture (260) additional sensor data. In one scenario, the electronic device 246 may capture sensor data from a set of internal sensors. In an alternative or additional scenario, the electronic device 248 may capture sensor data from a set of external sensors, such as sensors that may be incorporated within the vehicle. The set of sensors may include, but are not limited to, any of the following: clock, accelerometer, location module (e.g., GPS chip), thermometer, seat heater sensor, gyroscope, compass, biometric, ignition sensor, speedometer, torque sensor, throttle position sensor, and/or other sensors. Generally, some of the set of sensors may be configured to generate telematics data associated with operation of the vehicle, where the set of telematics data may indicate speed, heading, acceleration data, braking data, turning data, and/or other relevant parameters associated with operation of the vehicle. Further, some of the set of sensors may be configured to generate sensor data indicative of the state or condition of the individual.

The electronic device 246 may analyze (262) the additional sensor data. According to embodiments, the electronic device 246 may analyze the additional sensor data to identify a set of characteristics associated with the individual and/or with the individual's operation of the vehicle. In particular, the electronic device 246 may determine characteristics or combinations of characteristics that may be indicative of the individual being distracted. For example, the electronic device 246 may determine that the individual has been operating the vehicle for over two continuous hours and that the seat heater of the vehicle has been activated for over an hour, a condition that may be indicative of a reduced level of attentiveness. For further example, the electronic device 246 may determine that the individual has not activated the vehicle brakes in over ten (10) minutes, another condition that may be indicative of a reduced level of attentiveness. It should be appreciated that various characteristics and combinations of characteristics associated with respective levels of distraction are envisioned, and that the associated information may be set, input, and/or modified as desired by an administrator.

The electronic device may identify (264) a location. In particular, the electronic device may identify its location via a set of GPS coordinates that may be representative of the location of the vehicle. After identifying the location, the electronic device may retrieve (266), from the server(s) 248, data associated with the location identified in (264). In particular, the retrieved data may indicate that a certain location or area is deemed as distraction-prone and/or susceptible to incidents. For example, a certain location or area may experience a higher incidence of vehicle accidents or incidents. For further example, a certain location or area may experience a higher volume of traffic and/or pedestrians. In an implementation, the retrieved data may indicate a risk score (or similar metric) for the particular location, where the higher the risk score, the higher the risk of incident at that particular location.

The electronic device 246 may determine (268) whether there is an elevated risk of incident associated with the individual operating the vehicle. Specifically, the electronic device 246 may calculate a risk of incident (e.g., a metric on a predetermined scale) and determine whether the risk of incident exceeds a threshold value. For example, if the calculated risk of incident is "8" and the threshold value is "7", then the electronic device 246 may determine that there is an elevated risk of incident. According to embodiments, the electronic device 246 may calculate the risk of incident based on any combination of the image data (and the analysis thereof), the additional sensor data (and the analysis thereof), and the location data.

As an example, the electronic device 246 may determine that the vehicle is approaching a stretch of roadway that has a higher incidence of accidents than other nearby stretches of roadway, and may also determine from the image data and the additional sensor data that the individual is not showing signs of being distracted. Accordingly, the electronic device 246 may deem that the individual is not at an elevated risk of incident.

As another example, the electronic device 246 may determine that the vehicle is located in a school zone with a reduced speed limit, and may also determine from the image data and the additional sensor data that the individual is showing signs of being distracted. Accordingly, the electronic device 246 may deem that the individual is at an elevated risk of incident.

If the electronic device 246 determines that the individual is not at an elevated risk of incident ("NO"), processing may repeat, end, or proceed to other functionality. If the electronic device 246 determines that the individual is at an elevated risk of incident ("YES"), the electronic device 246 may generate (270) a notification. In embodiments, the notification may be in the form of a visual and/or auditory notification that indicates or annunciates a warning for the individual. The electronic device 246 may also determine a set of suggestions for modifying vehicle operation to reduce risk of incident. For example, a suggestion could be to reduce speed or to turn on headlights. In embodiments, the notification may include information associated with the location as well as the suggestion(s) for modifying vehicle operation to reduce a risk of incident.

The electronic device 246 may also display (272) the notification. In one implementation, the electronic device 246 may display the notification in the form of a pop-up notification that may be displayable by a user interface of the electronic device 246. In an alternative or additional implementation, the electronic device 246 may annunciate the notification via a speaker component of the electronic device 246. As a result, the individual operating the vehicle may notice and review the notification, assess how to respond, and undertake any vehicle operation adjustments that may mitigate the posed risk. For example, the individual may slow down, pull the vehicle over, or undertake another action.

In an optional implementation, the electronic device 246 may cause the vehicle to activate (274) an autonomous mode and the vehicle may transition control from the individual to its on-board computer. In particular, the electronic device 246 may determine that, to mitigate risk, autonomous operation of the vehicle is safer than manual operation by the individual.

Figure 3B:
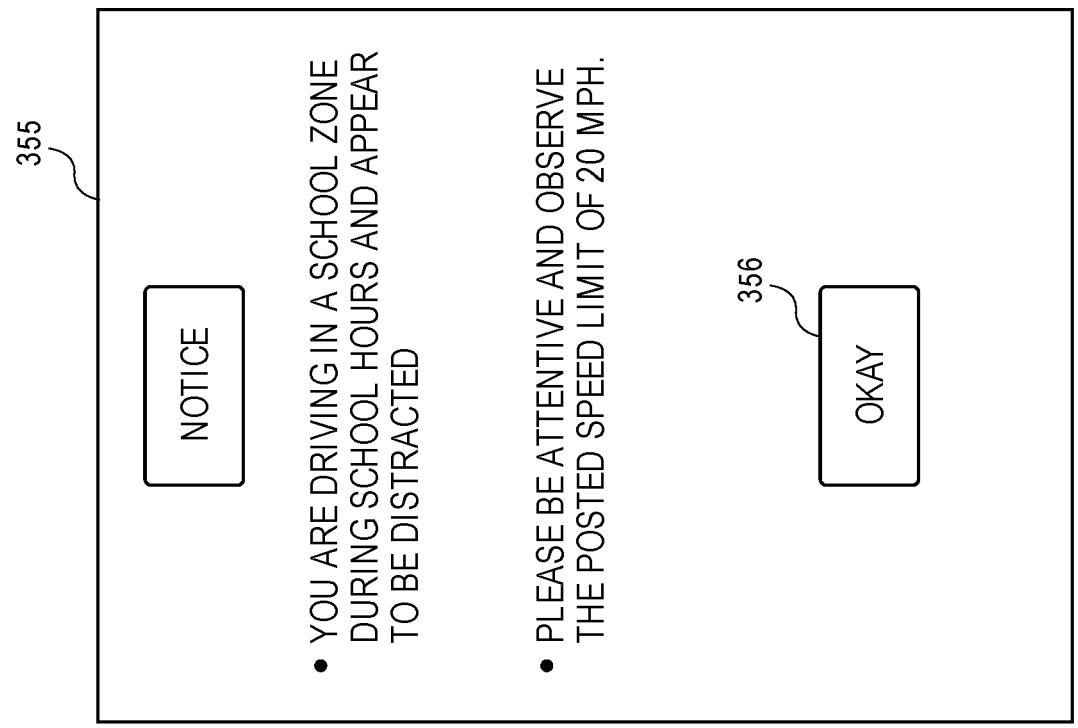
FIGS. 3A and 3B depict user interfaces associated with example notifications, in accordance with some embodiments.
Figure 3A:
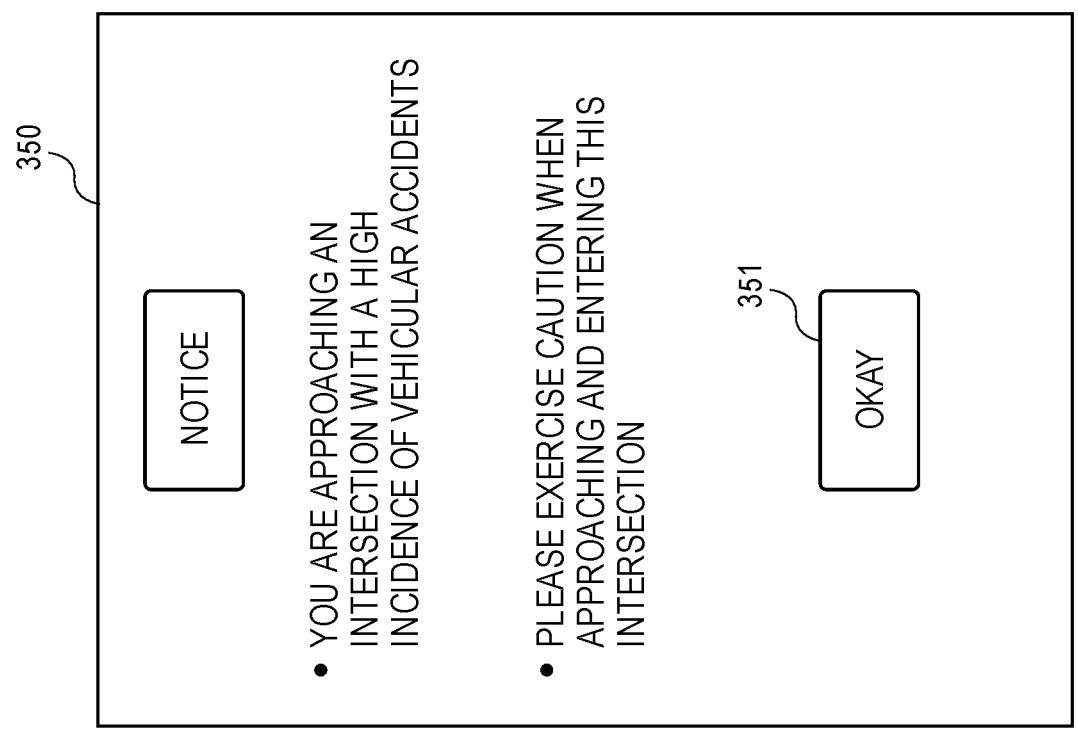

FIGS. 3A and 3B illustrate interfaces including example notifications. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely examples and that alternative or additional content is envisioned.

FIG. 3A illustrates an interface 350 that includes various information associated with a vehicle operator's current operation, in a scenario. In particular, the interface 350 indicates that the vehicle is approaching an intersection with a high incidence of vehicular accidents. Further, the interface 350 encourages the vehicle operator to exercise caution when approaching and entering the intersection. The interface 350 includes an okay selection 351 that when selected, causes the electronic device to dismiss the interface 350, or perform other functionalities.

FIG. 3B illustrates an interface 355 that includes various information associated with a vehicle operator's current operation, in another scenario. In particular, the interface 355 indicates that the vehicle is driving in a school zone during school hours and that the vehicle operator appears to be distracted. Further, the interface 355 encourages the vehicle operator to be attentive and observe the posted speed limit of 20 mph. The interface 355 includes an okay selection 356 that when selected, causes the electronic device to dismiss the interface 355, or perform other functionalities.

Figure 4:
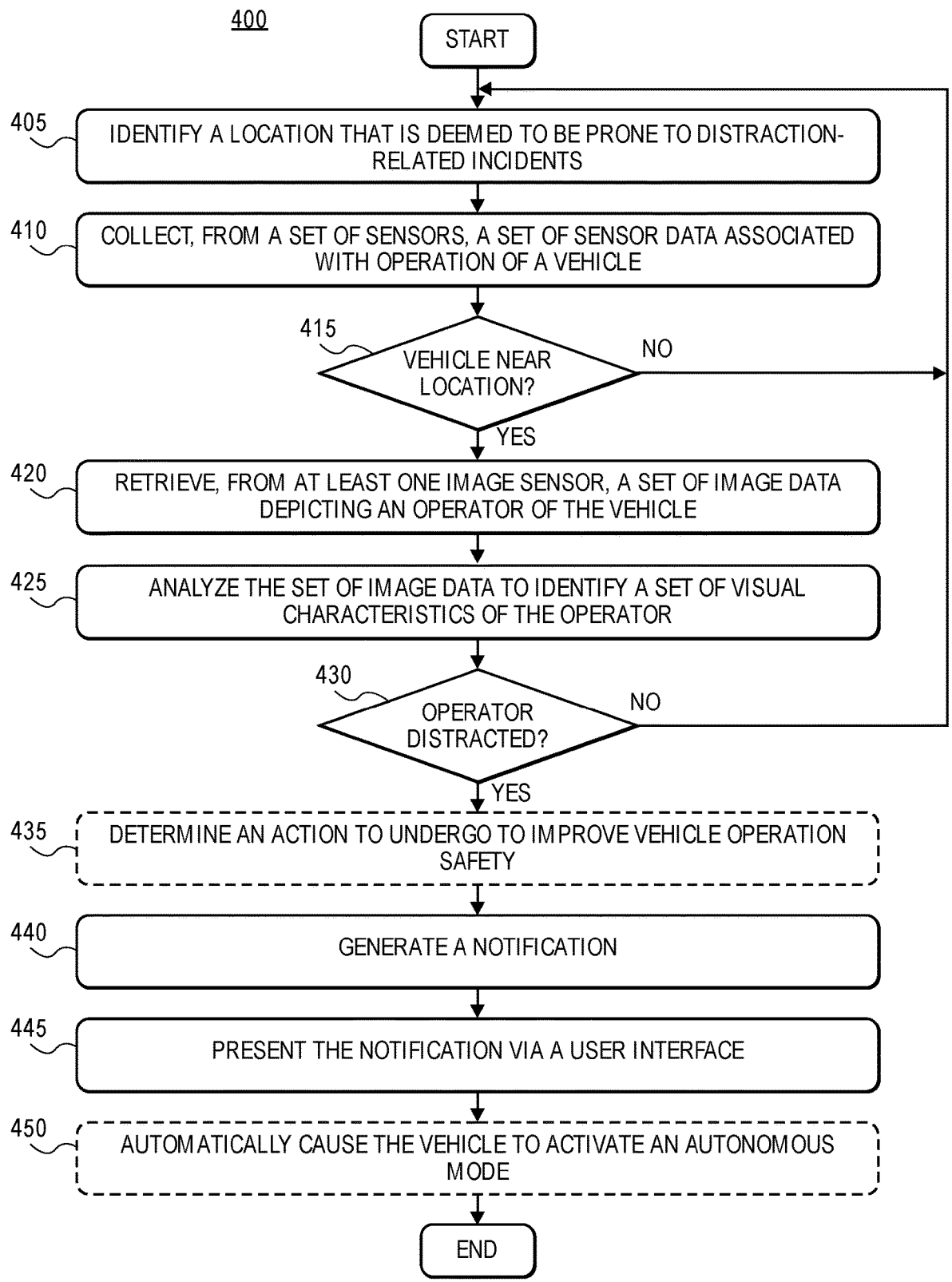
FIG. 4 depicts an exemplary flow diagram associated with improving safety within a vehicle, in accordance with some embodiments.

FIG. 4 depicts is a block diagram of an exemplary method 400 of improving safety within a vehicle. The method 400 may be facilitated by an electronic device that may be located within a vehicle or incorporated as part of the vehicle. The electronic device may support execution of a dedicated application that may facilitate the functionalities of the method 400. Further, the electronic device may enable a user or individual (e.g., an operator of the vehicle) to make various selections and facilitate various functionalities. Moreover, the electronic device may be equipped with and/or configured to communicate with a set of sensors.

The method 400 may begin at block 405 when the electronic device identifies a location that is deemed to be prone to distraction-related incidents. In embodiments, the electronic device may interface with a remote server to retrieve information associated a particular location, and determine, from the information, that the particular location is prone to distraction-related incidents. In an implementation, the electronic device may identify its current location (i.e., the location of the vehicle) and may retrieve the information associated with the particular location based on the current location, and/or based on a projected upcoming location (e.g., based on the heading and direction of travel of the vehicle).

At block 410, the electronic device may collect or accumulate, from a set of sensors, a set of sensor data associated with operation of the vehicle. In embodiments, the set of sensor data may include any combination of location data (e.g., in the form of GPS coordinates), various telematics data indicating vehicle operation parameters, and data indicating a state or condition of the vehicle operator.

At block 415, the electronic device may determine whether the vehicle is near the location that is deemed to be prone to distraction-related incidents. In an implementation, the electronic device may determine whether the vehicle is located within a threshold distance of the location. In an additional or alternative implementation, the electronic device may determine, based on at least one of location data, velocity (i.e., speed) data, and heading (i.e., direction) data, that the vehicle is approaching the location, in which case the vehicle may be deemed to be near the location. If the electronic device determines that the vehicle is not near the location ("NO"), processing may return to block 405 or block 410, may end, or may proceed to other functionality.

If the electronic device determines that the vehicle is near the location ("YES"), the electronic device may retrieve (block 420), from at least one image sensor, a set of image data depicting an operator of the vehicle. Further, the electronic device may analyze (block 425) the set of image data to identify a set of visual characteristics of the operator. According to embodiments, the set of visual characteristics may be any movements, states, or actions of the operator that may be depicted in the set of image data. It should be appreciated that the electronic device may retrieve the set of image data before, concurrent with, or after identifying the location and/or collecting or accumulating the set of sensor data.

The electronic device may determine (block 430) whether the operator is distracted. In particular, the electronic device may determine whether the operator is distracted based on the set of visual characteristics identified in block 425, the set of sensor data collected or accumulated in block 410, and/or the vehicle being near the location. In an embodiment, the electronic device may determine whether the operator is distracted based on the set of visual characteristics, and may then collect or accumulate the set of sensor data. In a particular implementation, the electronic device may calculate a risk score based on the vehicle being near the location and the operator of the vehicle being distracted (i.e., based on the set of visual characteristics), and may determine that the risk score exceeds a threshold value. If the electronic device determines that the operator is not distracted ("NO"), processing may repeat, end, or proceed to other functionality.

If the electronic device determines that the operator is distracted ("YES"), the electronic device may optionally determine (block 435) an action for the vehicle to undergo to improve vehicle operation safety. In embodiments, the electronic device may determine the action based on any of the level of distraction of the vehicle operator, the set of sensor data, and the location of the vehicle.

The electronic device may also generate (block 440) a notification. In embodiments, the notification may include information associated with the location that is prone to distraction-related incidents, any action determined in block 435, and/or general advice for the operator to be on alert. The electronic device may present (block 445) the notification via a user interface. Accordingly, the operator may review and assess the notification and the content thereof. In an optional embodiment, the electronic device may automatically cause (block 450) the vehicle to activate an autonomous mode. As a result, control of the vehicle may transition from the operator to an on-board computer of the vehicle.

Figure 5:
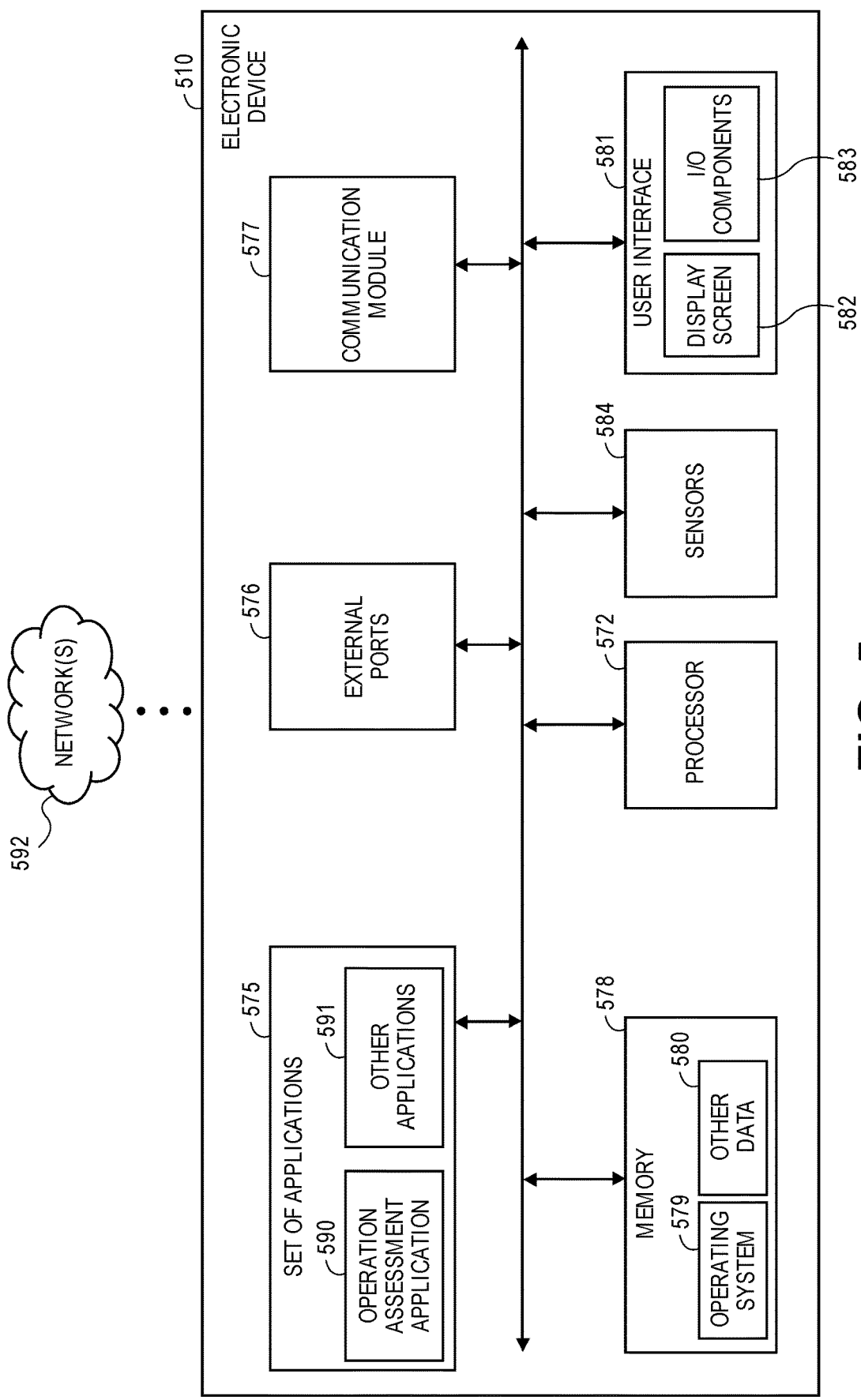
FIG. 5 is a block diagram of an exemplary electronic device, in accordance with some embodiments.

FIG. 5 illustrates a diagram of an exemplary mobile or other electronic device 510 (such as one of the electronic devices 131, 132, 246 as discussed with respect to FIGS. 1C and 2) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle.

The electronic device 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an operation assessment application 590 configured to analyze image and telematics data, identify risks, and facilitate notification communication. It should be appreciated that one or more other applications 591 are envisioned.

The processor 572 may interface with the memory 578 to execute the operating system 579 and the set of applications 575. According to some embodiments, the memory 578 may also include other data 580 that may include any data (e.g., image profile data, telematics data, location data, etc.) related to facilitating the functionalities as discussed herein. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 592. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 592, image data from a set of image sensors and telematics data from a set of additional sensors.

The electronic device 510 may further include a set of sensors 584. The processor 572 and the set of applications 575 may interface with the set of sensors 584 to retrieve and process the corresponding sensor data. The set of sensors 584 may include, for example, a location module, an accelerometer, a gyroscope, one or more image sensors, and/or the like. In one particular implementation, the operation assessment application 590 may use various data from the set of sensors 584 to facilitate certain functionalities.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch-sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of preventing vehicular incidents, the method comprising:
    accumulating, by one or more processors of an electronic device, a set of sensor data from a plurality of sensors that monitor in near real-time operation of a vehicle, the set of sensor data comprising at least location data and braking data;
    storing the location data and braking data;
    determining, by the one or more processors, that the vehicle is located within a threshold distance of a location that is susceptible to incidents from the location data;
    determining, by the one or more processors, that there is an elevated risk of an incident based on the braking data associated with the operation of the vehicle near the location, wherein the location includes a risk score associated with the location;
    determining, by the one or more processors, that the location is susceptible to incidents based on the risk score, wherein the higher the risk score the greater the risk of an incident at that particular location;
    generating, by the one or more processors, a notification indicating that there is the elevated risk of incident;
    presenting, by the one or more processors, the notification via a user interface of the electronic device; and
    in response to determining that there is the elevated risk, causing, by the one or more processors, the vehicle to transition control to an on-board computer of the vehicle.

2. The computer-implemented method of claim 1, wherein accumulating, from the electronic device the set of sensor data from the set of sensor monitoring the operation of the vehicle comprises:
    collecting, by the one or more processors, a set of telematics data from the set of sensors associated with the operation of the vehicle.

3. The computer-implemented method of claim 1, wherein determining, by the one or more processors, that there is the elevated risk of incident based on the braking data associated with the operation of the vehicle near the location comprises:
    determining, from at least the braking data, that the brakes of the vehicle have not been activated for a certain amount of time.

4. The computer-implemented method of claim 1, wherein causing the vehicle to transition control to the on-board computer of the vehicle comprises:
  automatically causing the vehicle to activate, by the one or more processors, an autonomous mode.

5. The computer-implemented method of claim 1, further comprising:
  determining an action, by the one or more processors, for the vehicle to undergo to improve safety of the operation of the vehicle based on the set of sensor data.

6. The computer-implemented method of claim 5, wherein generating the notification comprises:
  generating, by the one or more processors, the notification further indicating the action for the vehicle to undergo.

7. An electronic device incorporated as part of a vehicle, comprising:
  a user interface configured to present content;
  a memory adapted to store non-transitory computer executable instructions; and
  one or more processors configured to interface with the user interface and the memory, wherein the one or more processors is configured to execute the non-transitory computer executable instructions to cause the one or more processors to:
    accumulate a set of sensor data from a plurality of sensors that monitor in near real-time operation of the vehicle, the set of sensor data comprising at least location data and braking data;
    determine that the vehicle is located within a threshold distance of a location that is susceptible to incidents from the location data;
    determine that there is an elevated risk of an incident based on the braking data associated with the operation of the vehicle near the location, wherein the location includes a risk score associated with the location;
    determine that the location is susceptible to incidents based on the risk score, wherein the higher the risk score the greater the risk of an incident at that particular location;
    generate a notification indicating that there is the elevated risk of the incident;
    present the notification via the user interface; and
    in response to determining that there is the elevated risk, cause the vehicle to transition control to an on-board computer of the vehicle.

8. The electronic device of claim 7, wherein to accumulate the set of sensor data from a plurality of sensors that monitor in near real-time the operation of the vehicle, the one or more processors is configured to:
  collect, from the plurality of sensors, a set of telematics data associated with the operation of the vehicle.

9. The electronic device of claim 7, wherein the one or more processors is further configured to:
  retrieve information associated with the location from a server, and
  determine that the location is susceptible to incidents based on the information.

10. The electronic device of claim 9, wherein the information associated with the location comprises a risk score associated with the location; and wherein the one or more processors determines that the location is susceptible to incidents based on the risk score.

11. The electronic device of claim 7, wherein to determine that there is the elevated risk of incident based on the braking data associated with the operation of the vehicle near the location, the one or more processors is configured to:
  determine, from at least the braking data, that the brakes of the vehicle have not been activated for a certain amount of time.

12. The electronic device of claim 7, wherein to cause the vehicle to transition control to the on-board computer of the vehicle, the one or more processors is configured to:
  automatically cause the vehicle to activate an autonomous mode.

13. The electronic device of claim 7, wherein the one or more processors is further configured to:
  determine an action for the vehicle to undergo to improve safety of the operation of the vehicle.

14. The electronic device of claim 13, wherein the one or more processors generates the notification further indicating the action for the vehicle to undergo.

15. A computer-readable storage medium configured to store non-transitory computer-readable instructions, wherein the instructions when executed by one or more computer processors, cause the one or more processors to:
  accumulate a set of sensor data from a plurality of sensors that monitor in near real-time operation of a vehicle, the set of sensor data comprising at least location data and braking data;
  determine that the vehicle is located within a threshold distance of a location that is susceptible to incidents from the location data;
  determine that there is an elevated risk of an incident based on the braking data associated with the operation of the vehicle near the location, wherein the location includes a risk score associated with the location;
  determine the location is susceptible to incidents based on the risk score, wherein the higher the risk score the greater the risk of an incident at that particular location;
  generate a notification indicating that there is the elevated risk of incident;
  present the notification via a user interface of an electronic device; and
  in response to determining that there is the elevated risk, cause the vehicle to transition control to an on-board computer of the vehicle.

16. The computer-readable storage medium of claim 15, further configured to store non-transitory computer-readable instructions that when executed cause the one or more processors to:
  retrieve information associated with the location from a server; and
  determine that the location is susceptible to incidents based on the information.

17. The computer-readable storage medium of claim 15, further configured to store non-transitory computer-readable instructions that when executed cause the one or more processors to:
  determine there is the elevated risk of an incident associated with the operation of the vehicle near the location based on the braking data; and
  determine that the brakes of the vehicle have not been activated for a certain amount of time.

18. The computer-readable storage medium of claim 15, wherein to cause the vehicle to transition control to the on-board computer of the vehicle, the one or more processors is configured to:
  automatically cause the vehicle to activate an autonomous mode.

19. The computer-readable storage medium of claim 15, further configured to store non-transitory computer-readable instructions that when executed cause the one or more processors to:
  determine an action for the vehicle to undergo to improve safety of the operation of the vehicle.

20. The computer-readable storage medium of claim 19, further configured to store non-transitory computer-readable instructions that when executed cause the one or more processors to:
  generate the notification further indicating the action for the vehicle to undergo.

* * * * *